(12) United States Patent
Eichholz et al.

(10) Patent No.: US 7,416,240 B2
(45) Date of Patent: Aug. 26, 2008

(54) CABRIOLET VEHICLE

(76) Inventors: Stefan Eichholz, Alter Postweg 33, 49163 Bohmte (DE); Jurgen Theuerkauf, Muhlenesch 1, 49565 Bramsche (DE)

( * ) Notice: Subject to any disclaimer, the term of this patent is extended or adjusted under 35 U.S.C. 154(b) by 0 days.

(21) Appl. No.: 10/541,314

(22) PCT Filed: Dec. 19, 2003

(86) PCT No.: PCT/DE03/04118

§ 371 (c)(1),
(2), (4) Date: Jun. 12, 2006

(87) PCT Pub. No.: WO2004/062951

PCT Pub. Date: Jul. 29, 2004

(65) Prior Publication Data

US 2006/0279104 A1    Dec. 14, 2006

(30) Foreign Application Priority Data

Jan. 9, 2003    (DE) ............................... 103 00 342

(51) Int. Cl.
*B60J 7/00* (2006.01)
(52) U.S. Cl. ................... 296/107.01; 296/108; 296/121
(58) Field of Classification Search ........... 296/107.01, 296/108, 121
See application file for complete search history.

(56) References Cited

U.S. PATENT DOCUMENTS

| 1,799,050 | A | 3/1931 | Kuturlash | |
|---|---|---|---|---|
| 6,086,958 | A | 7/2000 | Russell et al. | |
| 6,325,445 | B1 | 12/2001 | Schenk | |
| 6,824,194 | B2 | 11/2004 | Weissmueller et al. | |
| 7,178,852 | B2 * | 2/2007 | Obendiek et al. | 296/108 |
| 2003/0218355 | A1 * | 11/2003 | Stenvers et al. | 296/108 |
| 2005/0029833 | A1 * | 2/2005 | Obendiek | 296/108 |

FOREIGN PATENT DOCUMENTS

| DE | 10159390 C1 * | 11/2002 |
|---|---|---|
| EP | 1074415 A2 * | 2/2001 |

* cited by examiner

*Primary Examiner*—Lori L Lyjak
(74) *Attorney, Agent, or Firm*—Howrey LLP (57) ABSTRACT

The invention relates to a cabriolet vehicle (1) with a roof (2; 102), comprising at least two moving units (6, 14; 106, 114) each mounted on main bearings (7, 8; 15, 16; 107, 108; 115) fixed to the chassis such as to move and each of which is provided with a rigid roof section (3, 4; 103, 104). At least one rear rigid roof section (4; 104), comprising a rear window (5; 105), is connected to a main bearing (15, 16; 115) by means of a multi-part articulated chain (17; 117), whereby a part (18; 118) of the articulated chain (17; 117) brings about at least one movement of the rigid roof section (4; 104) relative to the main bearing (15, 16; 115) and a part (19; 119) of the articulated chain (17; 117) brings about at least one change in the angular position of the rigid roof section (4; 104).

10 Claims, 12 Drawing Sheets

CABRIOLET VEHICLE

The invention concerns a cabriolet motor vehicle with a roof having at least two moving units mounted separately according to the preamble to Claim 1.

Many state-of-the-art solutions are known in which the roof is made up of a single moving unit held on one main lateral bearing. Particularly on a roof with several parts, the individual parts of said roof must then be folded against one another when it is opened, and braces are provided for this between the parts of the roof. However, especially on sports cars they project into the passenger headroom. The one moving unit is therefore a heavy weight that requires large drives to move it that take extra space. When it is opened, the roof-moving sequences as a whole and the relative movement of the roof parts toward one another take place, at least in part, one after another over time, which makes the opening time longer.

It can therefore be desirable to provide a roof with several moving units mounted separately from one another. EP 1 074 415 A2 shows such a cabriolet vehicle with two moving units mounted separately, whereby the back moving unit includes a rigid roof part with a rear window and the front moving unit includes two rigid roof parts that can be nested one inside the other. The moving units are forced to synchronize with one another via a coupling rod. The back moving unit is held so it can pivot in its main bearing via a swing arm with a degree of rotational freedom, whereby the rigid roof part assigned to it must be placed in the overhead position very far back in the rear of the vehicle. This substantially limits the remaining trunk space.

The invention is based on the problem of improving the opening kinetics of a conventional cabriolet vehicle with several separate moving units of the roof.

According to the invention, through the different functions of the parts of the link chain, at the same time and optimized to the movement sequence, it is possible to overlap the total movement of the respective moving unit and to change the position of the rear part of the roof in relation to the other parts of the roof. This can speed up the movement of opening and closing the roof. The total and relative movements can take place at the same time. The parts of the link chain can also be moved counter-clockwise during part or all of the opening movement, so that any movement curve of the front edge of the rigid roof part held by the link chain is possible.

At the same time, the rear part and another front part of the roof can also be set in motion very close to one another, with no risk of a collision between them.

Thus, the rigid rear roof part can be oriented so that the side of the part of it that points to the outside when closed can also point up. Because of the curve in the rear window, the trunk space under it is therefore enlarged. With the link chain during the opening movement, the rigid rear roof part can be moved further forward in the driving direction, compared to a purely swiveling movement, which also increases the trunk space.

Advantageously, the individual parts of the link chain can also be forced to move via this coupling member assigned to them by a moving unit for one or more roof parts that are in front. This rules out a malfunction and simplifies the mechanical design.

In the resting position, it is possible to nest the roof parts in the same direction and pack the parts densely, which takes up less space.

Other advantages and features of the invention can be found in the examples of embodiment of the subject of the invention shown in the drawings and described below.

The cabriolet vehicle 1 shown in FIGS. 1 to 6 includes a roof 2, which has two parts 3, 4 here with rigid frames or at least one rigid frame lying one behind the other in the closed position. The rear roof part 4 includes a rear window 5.

The front roof part 3 is an integral part of the first moving unit 6, which is connected to the chassis 11 so it can swivel via guide bars 9, 10 at two bearings 7, 8 one behind the other in the driving direction F and slightly offset in height in the example of embodiment. The guide bars 9, 10 grasp the front part of the roof 3 via other swivel joints 12 on their ends opposite the bearings 7, 8, thus forming a four-bar linkage with hinges 7, 8, 12, 13. Roof part 3—not not shown here— can hold another roof part mounted in front of it, which is connected to roof part 3, and when the roof is opened, can be moved over or under it, in a counterclockwise or especially a clockwise direction.

The rear part 4 of the roof is an integral part of a second moving unit 14 mounted on the chassis 11 separately. It holds roof part 4 so it can move in relation to the chassis 11 via two swivel bearings 15, 16 attached to the chassis and in turn lying one behind the other and one link chain 17 supported on it.

The link chain 17 includes a first lower part 18 that is connected to the chassis and therefore starts the total movement of at least moving unit 14. An angular change in the position of roof part 4 can be made by this part 18.

The link chain 17 also includes a second upper part 19 that overlaps the angular position of roof part 4 that is adjusted by the lower part 18, and thus optimized as desired.

The lower part 18 includes two guide bars 20, 21 connected to the chassis 11 at bearings 15, 16 and a longitudinal arm 22 of an L-shaped guide arm 23, on which lie bearings 24, 25 on the ends of the guide bars 20 turned away from the chassis. Joints 15, 16, 24 and 25 thus form a lower four-bar linkage.

The upper part 19 includes two guide bars 29, 30 connected to the short bar 28 of the L-shaped guide bar 23 at bearings 26, 27, as well as a lever 31 tightly connected to the rigid roof part 4, on which lie the bearings 32, 33 on the ends of guide bars 29, 30 turned away from the L-shaped guide bar 23. Joints 26, 27, 32 and 33 thus form an upper four-bar linkage.

To couple the lower part 18 of the moving unit 14 to the front moving unit 6, a first coupling rod 35 is provided that is connected so it can pivot on one end to the projection 34 of guide bar 10 of the front moving unit 6 and on the other end to the projection 36 of guide bar 20 of the rear moving unit 14.

To couple the upper part 19 of the moving unit 14 to the front moving unit 6, a second coupling rod 37 is provided that is connected so it can swivel on one end to the projection 38 of the same guide bar 10 of the front moving unit 6 and on the other end to an extension 39 of the guide bar 30 of the rear moving unit 14.

When the roof 2 is opened, the drive, if it acts on one of the front guide arms 9, 10 opens the four-bar linkage 7, 8,12 and 13 of the front moving unit 6, whereby the guide arms 9, 10 swivel back in the direction of arrows 40, 41. The coupling rod 35 opens four-bar linkage 15, 16, 24 and 25 forming the lower part 18 of the rear moving unit 14 in the same direction so that both rigid roof parts 3, 4 move back and down slightly.

At the same time, the second coupling rod 37 opens the four-bar linkage 26, 27, 32 and 33 forming the upper part 19 of the rear moving unit 14 in the opposite direction, in the direction of arrow 42, whereby lifting the lever 31 swivels the rear roof part 4 up in the direction of arrow 43, thus preventing the risk of a collision between roof parts 3 and 4. Right at the beginning of the opening movement, the roof parts 3, 4 can start to nest one inside the other, which accelerates the opening and closing movement. Moving the two parts 18, 19 of the link chain in opposite directions makes fast, very precise roof movements possible.

Thus, the rear roof part 4 does not have to move particularly sharply upward; there merely needs to be a slight increase in the angle and a slight overall lifting of roof part 4 from the horizontal in order to prevent the risk of collision. It is therefore also possible to open and close the roof, even in low spaces, for example in underground garages. As it opens further (transition from FIG. 3 to FIG. 6), the rear roof part 4 goes down in such a way that the rear window 5 points up on the outside. Then the front part 3 of the roof is held under it in the same direction. Another roof part suspended on the front roof part 3 could be mounted all the way down or between the other two.

In a second example of embodiment (FIGS. 7 to 12), the front moving unit 106 is made, in principle, similar to moving unit 6 in the first example of embodiment. Here again, two bearings 107, 108 one behind the other and slightly offset in height are provided for guide arms 109, 110, via which roof part 103 is connected to the chassis so it can swivel. The guide arms 109, 110 act on the ends opposite the bearings 107, 108 via other swivel joints 112, 113 on the front roof part 103. Thus, here again, a four-bar linkage is formed by joints 107, 108, 112 and 113. Roof part 103 can in turn be a support for another roof part mounted in front of it.

The rear roof part 104 is an integral part of a second moving unit 114, which is mounted to the chassis separately, but which is much simpler in design:

It contains only one swivel bearing 115 attached to the chassis and one link chain 117 supported on it that holds roof part 104 so it can move in relation to the chassis.

Link chain 117 in turn includes a first lower part 118 and a second upper part 119 with the functions discussed above.

However, the lower part 118 basically includes only one guide arm 120 connected to the chassis at bearing 115 whose end facing away from the chassis on one swivel bearing 124 is connected as a joint to upper guide bar 129 that is connected directly and tightly to roof part 104.

The upper part 119 includes this guide bar 129, which extends between the moving bearing 124 and roof part 4 and is connected tightly to it.

To couple the lower part 118 of the moving unit 114 to the front moving unit 106, a first coupling rod 135 is provided that is connected on one end to a projection 134 of guide bar 110 of the front moving unit 106 and on the other end directly to guide bar 120 of the rear moving unit 114 so it can make a swivel movement.

To couple the upper part 119 of the moving unit 114 to the front moving unit 106, a second coupling rod 137 is provided that is connected on one end directly to the same guide bar 110 of the front moving unit 106 and on the other end directly to guide bar 129 at joint 132 so it can make a swivel movement.

Only one drive is enough to open or close the roof.

To open the roof 102, the drive, when it is engages one of the front guide bars 109, 110, opens the four-bar linkage 107, 108, 112 and 113 of the front moving unit 106, whereby the guide bars 109, 110 swivel back in the direction of arrows 140, 141. Due to the coupling rod 135, the guide bar 120 forming the lower part 118 of the rear moving unit 114 is opened in the same direction, so that both rigid roof parts 103, 104 are moved back and down slightly.

Figure 1:
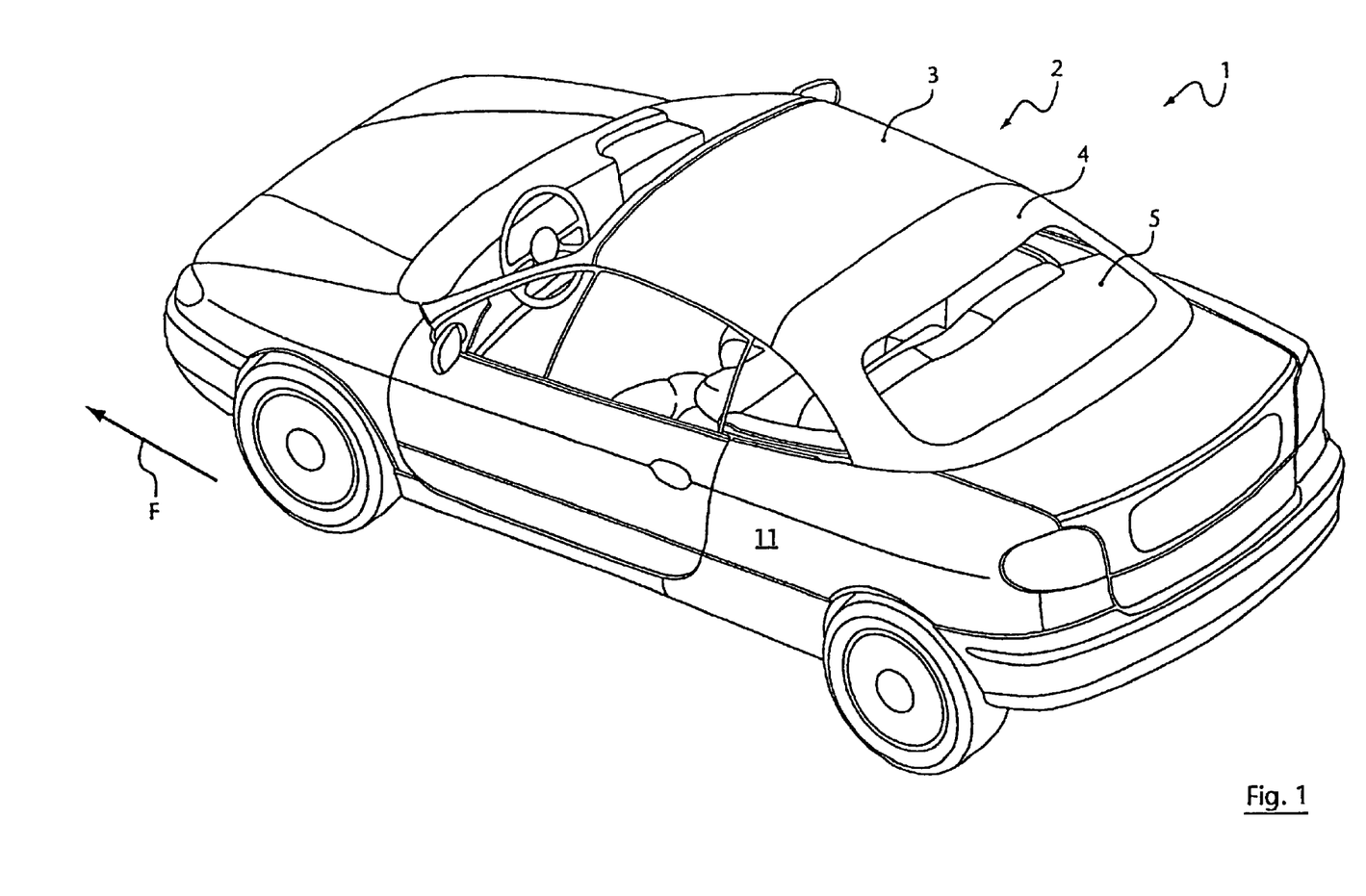
FIG. 1 the cabriolet vehicle in the invention with two solid roof parts in a perspective overview with the roof closed, FIG. 2 a roof and a chassis, shown in dashes, of the cabriolet vehicle in the invention in a schematic side view with the roof closed, FIG. 3 the roof in FIG. 2 when it starts to open, FIG. 4 the roof in FIG. 3 when it is more open, FIG. 5 the roof in FIG. 4 when almost open, FIG. 6 the roof in FIG. 5 when all the way open, FIGS. 7-12 a second embodiment of a roof, shown schematically in which FIG. 7 the roof is closed, FIG. 8 the roof is starting to open, FIG. 9 the roof is more open, FIG. 10 the roof is more open, FIG. 11 the roof is in the open position shortly before it goes all the way down, FIG. 12 the roof is all the way down.
Figure 2:
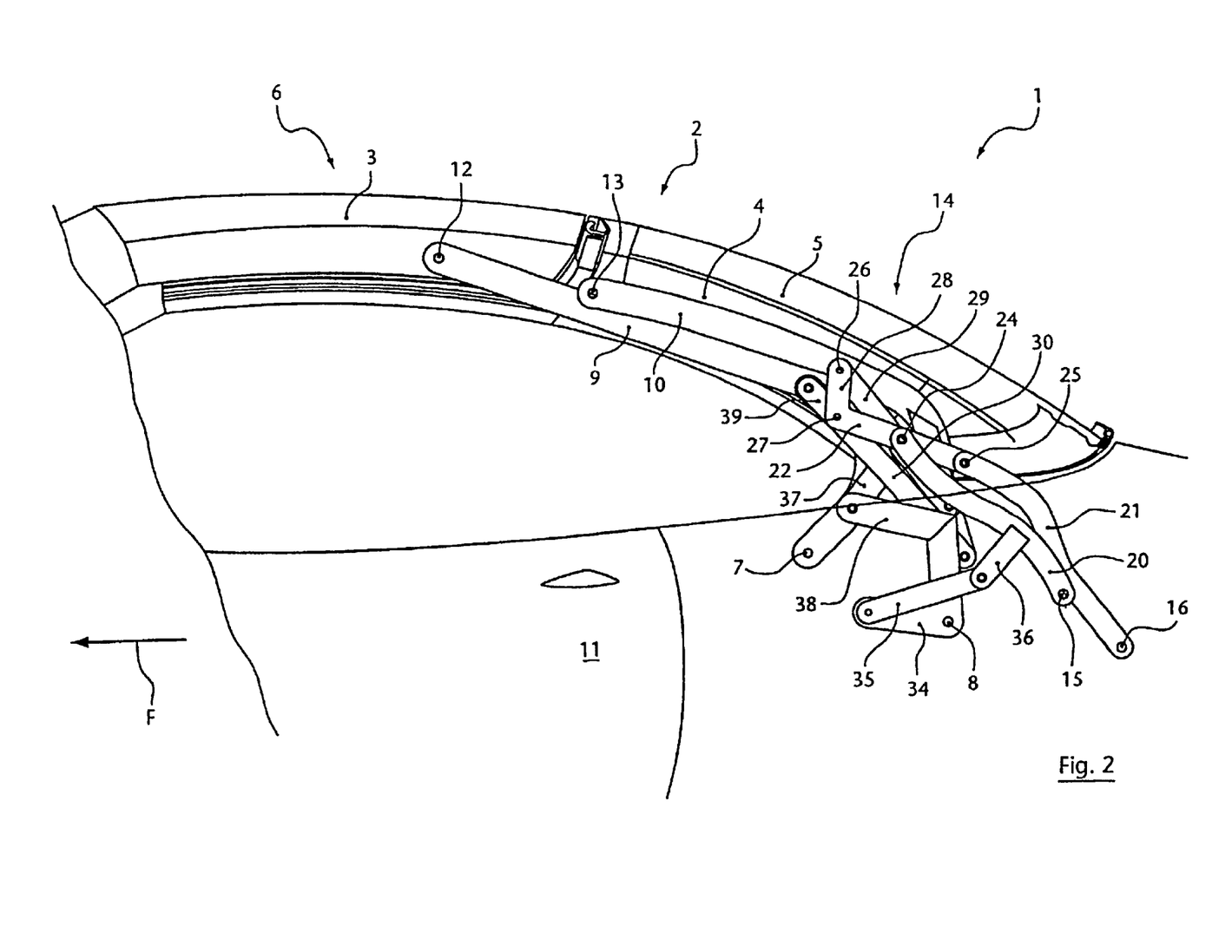
Figure 3:
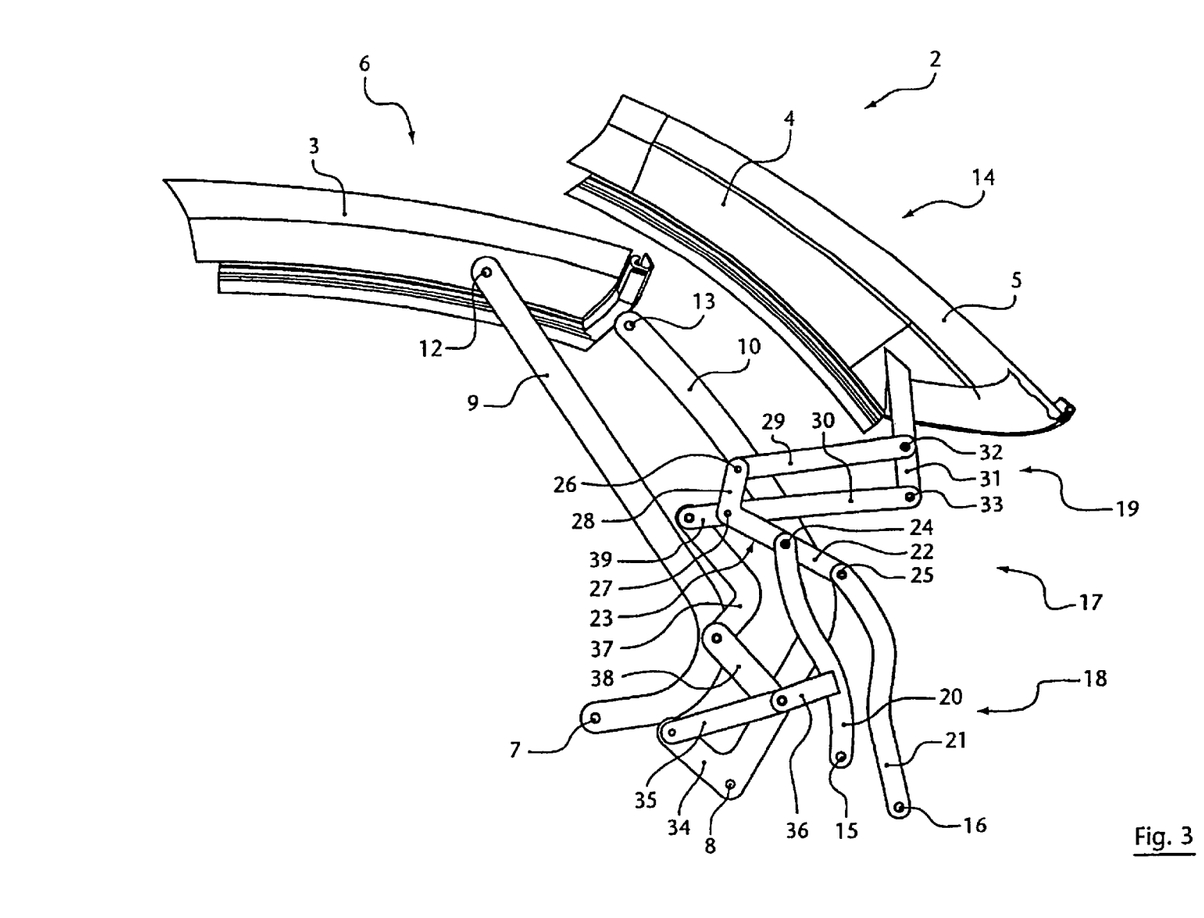
Figure 4:
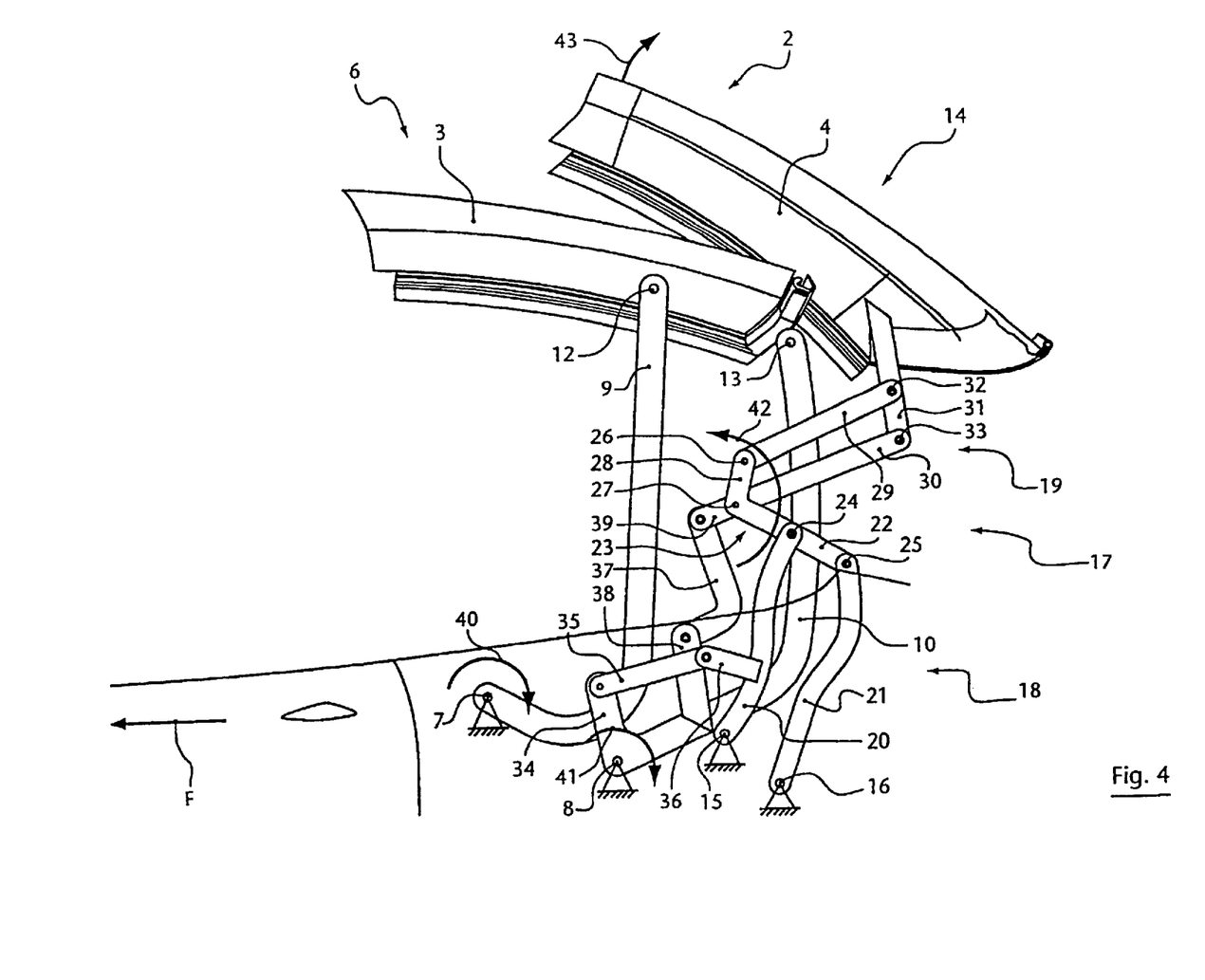
Figure 5:
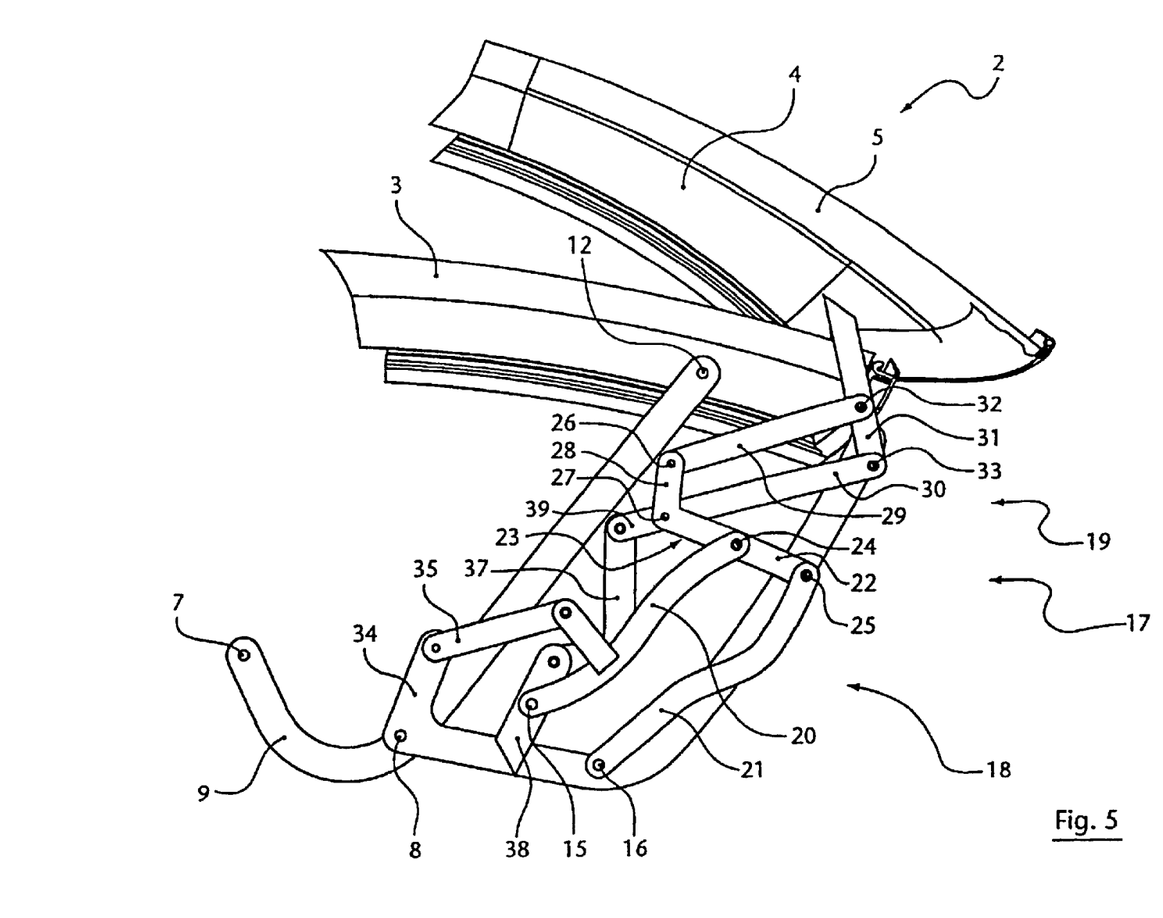
Figure 6:
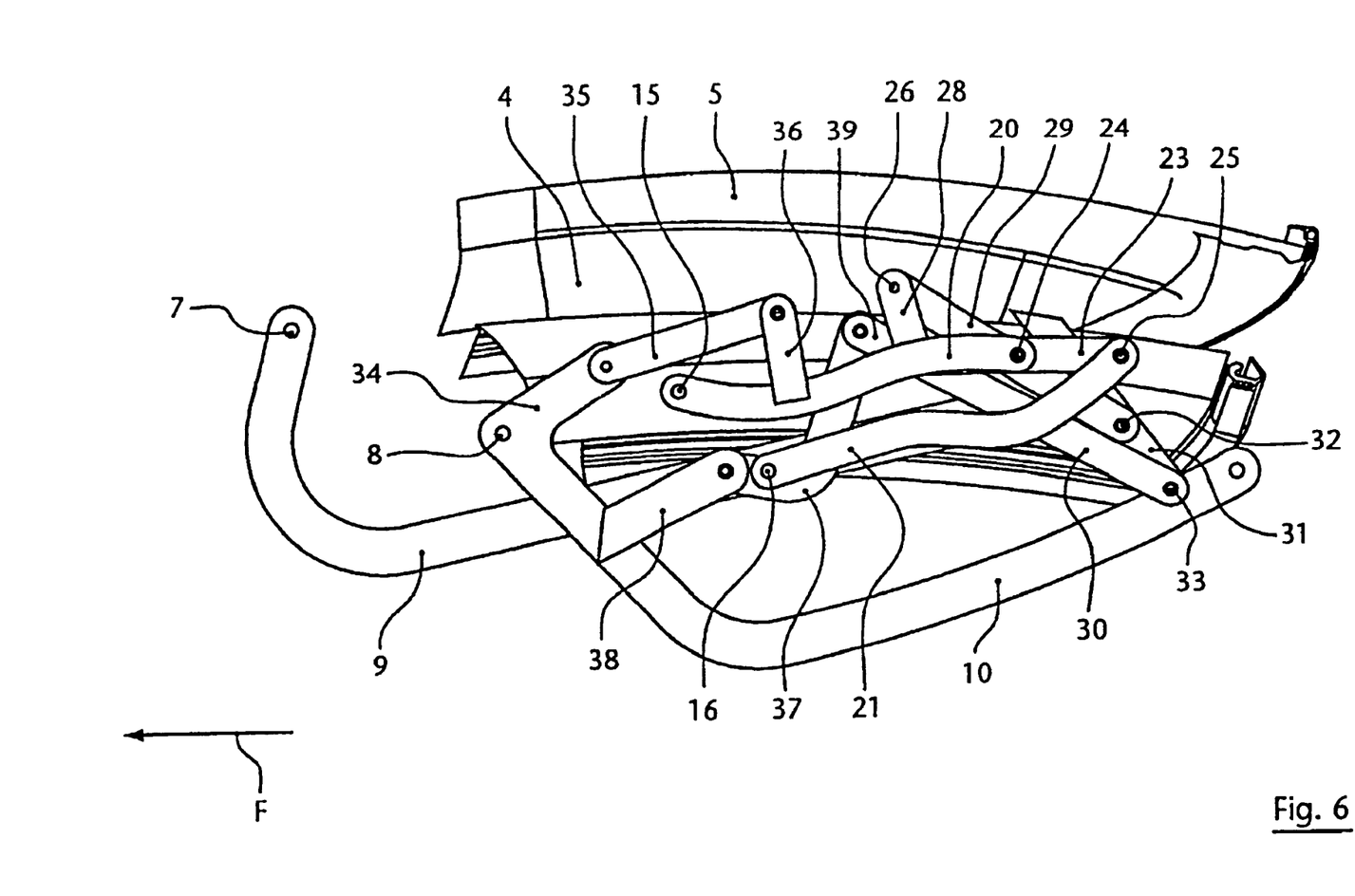
Figure 7:
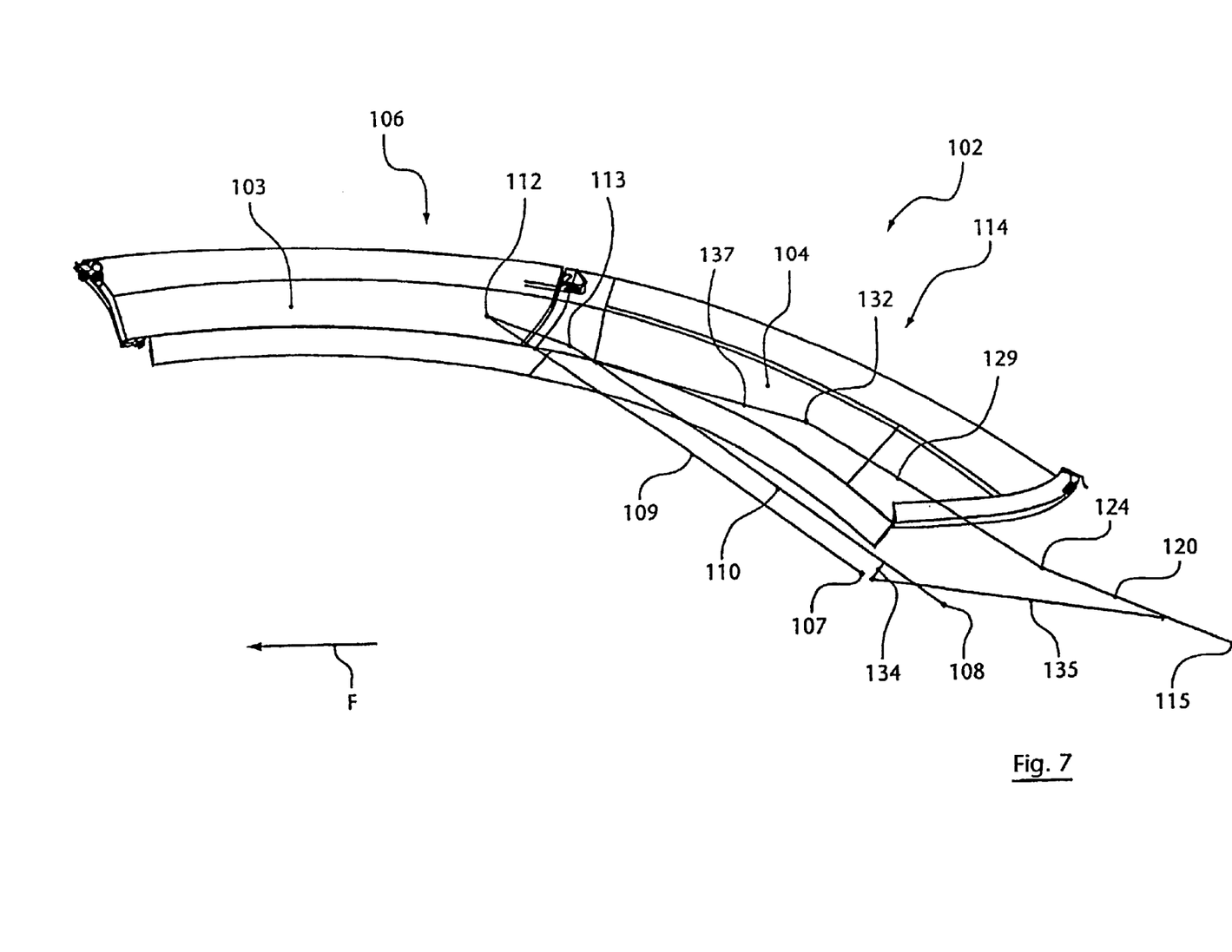
Figure 8:
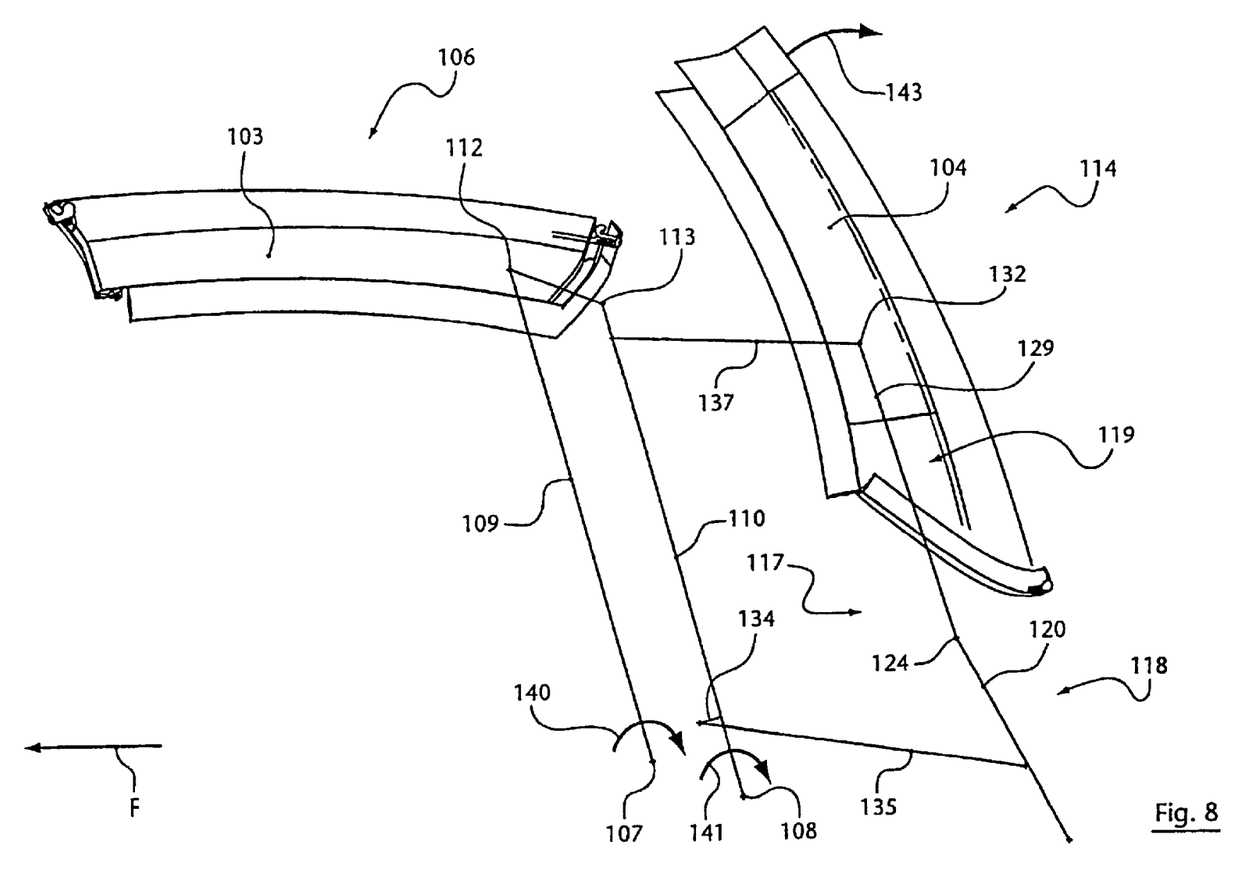
Figure 9:
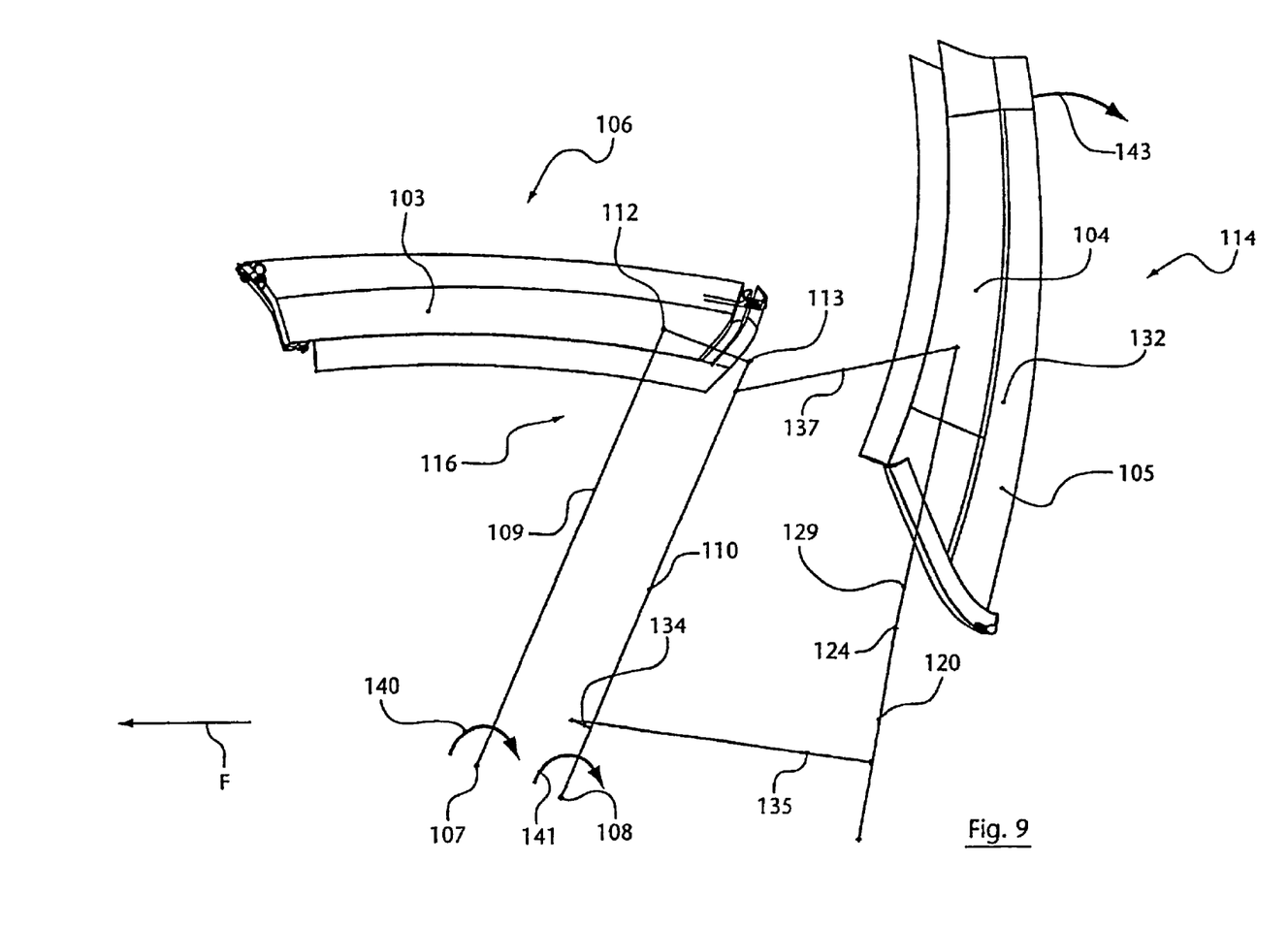
Figure 10:
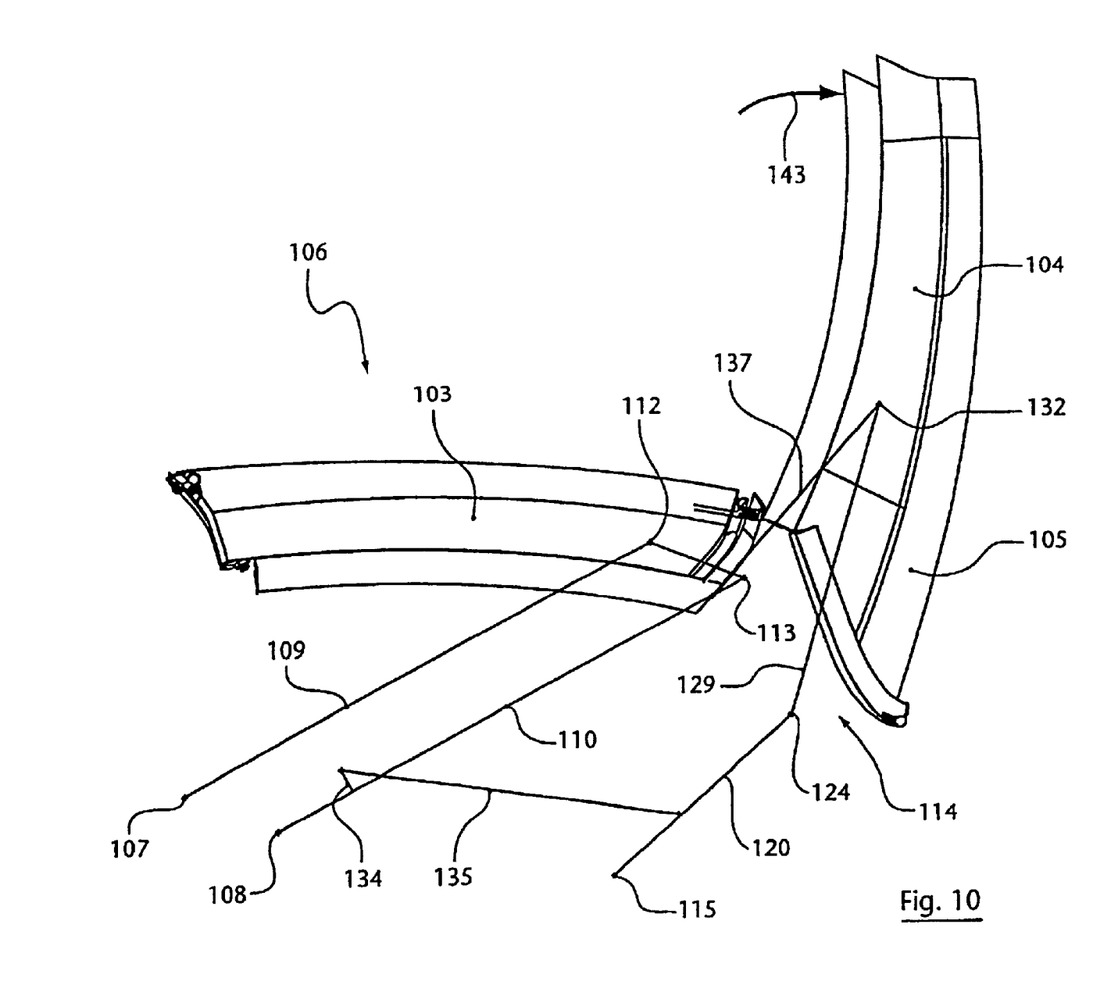
Figure 11:
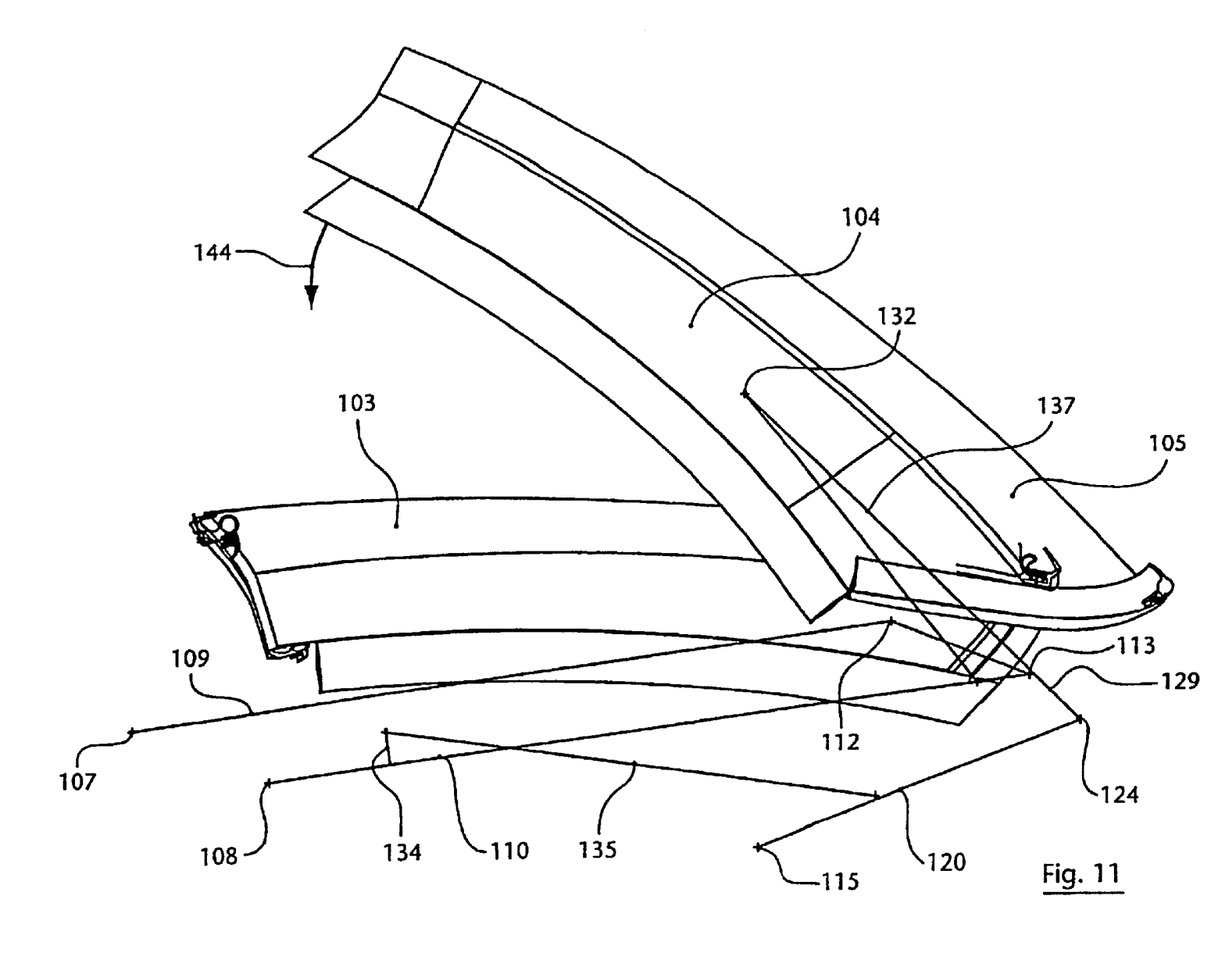

At the same time, with the second coupling rod 137, the guide bar 129 forming the upper part 119 of the rear moving unit 114 swivels back first during the opening phase between FIGS. 6 and 10 in the same direction, whereby the rear roof part 104 is moved up in the direction of arrow 143, and in FIG. 10 reaches an extreme setting of its angle of aperture, from which it swivels on the rear roof part 104 in the opposite direction in the direction of arrow 144. Right at the beginning of the opening movement, the separating line between parts 103 and 104 is greatly increased, which here again makes fast, collision-free opening possible.

Figure 12:
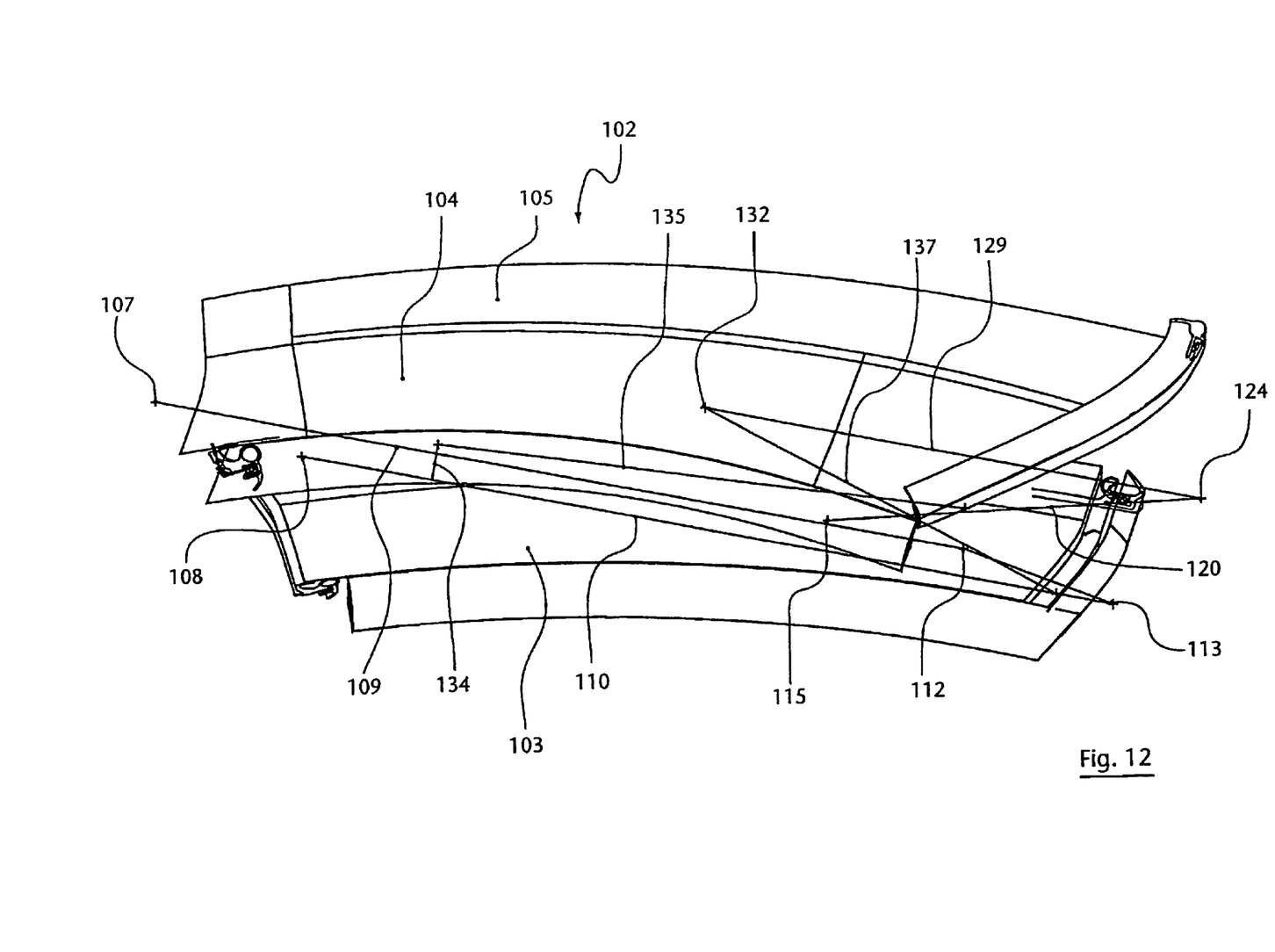

From the extreme setting in FIG. 10, the joint 124 clearly collapses, so that the angles between guide bar 120 on the lower part 118 and guide bar 129 on the upper part 118 are made much smaller, and the two guide bars 120, 129 are at a sharp angle to one another (FIG. 12). Here again, the rear roof part 104 goes down in the direction of arrow 144 in such a way that the rear window 105 points up on the outside. Then, the front roof part 103 is held under it in the same direction. Another roof part suspended on the front roof part could be held as in the first example of embodiment.

Instead of the examples of embodiment shown, other link chains are also possible, even a seven-link. With a corresponding design, a single mechanical coupling may be enough for the front moving unit to move the upper and lower parts of the link chain separately.

The invention claimed is:

1. A cabriolet motor vehicle, comprising:
    a chassis;
    a plurality of main bearings; and
    a roof having at least a first moving unit and a second moving unit being simultaneously movable, the first moving unit including a rigid portion and being connected to the chassis through at least a first portion of the plurality of main bearings, the second moving unit including a rigid portion and a rear window portion and being separately connected to the chassis through at least a second portion of the plurality of main bearings by a multi-link chain,
    wherein the second moving unit is movable by at least one part of the multi-link chain.

2. The cabriolet vehicle as claimed in claim 1, wherein the multi-link chain includes a first and second part, the first and second part being movable by at least one coupling rod being movable by a movement of at least one of the first and second moving units.

3. The cabriolet vehicle as claimed in claim 1, wherein the multi-link chain includes two four-bar linkages connectable to each other.

4. The cabriolet vehicle as claimed in claim 1, wherein the multi-link chain includes a seven-bar linkage.

5. The cabriolet vehicle as claimed in claim 1, wherein the first moving unit includes a four-bar linkage with two guide bars, the four-bar linkage being configured to form a parallelogram.

6. The cabriolet vehicle as claimed in claim 2, wherein the first moving unit includes a four-bar linkage with two guide bars, the four-bar linkage being configured to form a parallelogram.

7. The cabriolet vehicle as claimed in claim 6, wherein the at least one coupling rod is engageable with at least one of the two guide bars.

8. The cabriolet vehicle as claimed in claim 1, wherein the rear window of the second moving unit is configured to point up on an outside when the roof is in an open position.

9. The cabriolet vehicle in one of claims 8, wherein the first and second moving units are capable of being positioned in the same direction when the roof is in the open position.

10. The cabriolet vehicle in one of claims 1, wherein the first and second moving units are capable of being positioned in the same direction when the roof is in the open position.

* * * * *